(12) United States Patent
Gopalakrishnan

(10) Patent No.: US 6,504,640 B2
(45) Date of Patent: Jan. 7, 2003

(54) RESONANT OPTICAL MODULATORS WITH ZERO CHIRP

(75) Inventor: Ganesh K. Gopalakrishnan, Bethesda, MD (US)

(73) Assignee: Codeon Corporation, Uolumbia, MD (US)

( * ) Notice: Subject to any disclaimer, the term of this patent is extended or adjusted under 35 U.S.C. 154(b) by 53 days.

(21) Appl. No.: 09/780,567

(22) Filed: Feb. 12, 2001

(65) Prior Publication Data

US 2002/0110302 A1 Aug. 15, 2002

(51) Int. Cl.[7] .............................. G02F 1/03; G02F 1/035
(52) U.S. Cl. ........................ 359/245; 359/238; 359/254; 385/2; 385/8
(58) Field of Search ................................. 359/238, 254, 359/322, 278, 245; 385/1, 4, 2, 8, 3, 9, 14, 15, 16, 24, 27, 31, 39, 40, 41, 130, 131, 132

(56) References Cited

U.S. PATENT DOCUMENTS

| 5,074,631 | A | 12/1991 | Hamano et al. | 385/3 |
|---|---|---|---|---|
| 5,303,079 | A | 4/1994 | Gnauck et al. | 359/188 |
| 5,408,544 | A | 4/1995 | Seino | 385/3 |
| 5,787,211 | A | 7/1998 | Gopalakrishnan | 385/2 |
| 6,381,379 | B1 * | 4/2002 | Burns | 385/2 |

OTHER PUBLICATIONS

A. H. Gnauck et al., "Dispersion Penalty Reduction Using an Optical Modulator with Adjustable Chirp," IEEE Photonics Technology Letters, vol. 3, No. 10, Oct. 1991, pp. 916–918.

G. K. Gopalakrishnan et al., "Performance and Modeling of Broad Band LiNbO$_3$ Traveling Wave Optial Intensity Modulators," Jour. Of Lightwave Technology, vol. 12, No. 10, Oct. 1994, pp. 1807–1819.

G. K. Gopalakrishnan et al., "Performance and Modeling of Resonantly Enhanced LiNbO$_3$ Modulators for Low–Loss Analog Fiber–Optic Links," IEEE Trans. On Microwave Theory and Techniques, vol. 42, No. 12, Dec. 1994, pp. 2650–2656.

P. Jiang et al. "LiNbO$_3$ Mach–Zehnder Modulators with Fixed Negative Chirp," IEEE Photonics Technology Letters, vol. 8, No. 10, Oct. 1996, pp. 1319–1321.

G. H. Smith et al., "Overcoming Chromatic–Dispersion Effects in Fiber–Wireless Systems Incorporating External Modulators," IEEE Trans. On Microwave Theory and Techniques, vol. 45, No. 8, Aug. 1997, pp. 1410–1415.

* cited by examiner

*Primary Examiner*—Hung Xuan Dang
*Assistant Examiner*—Tuyen Tra
(74) *Attorney, Agent, or Firm*—Morgan, Lewis & Bockius LLP

(57) ABSTRACT

An external resonant optical modulator is provided by forming a waveguide electrode structure coupled to a coplanar strip or coplanar waveguide pattern including a ring resonator electrode and a ground electrode substantially surrounding the ring resonator electrode. These electrode patterns are disposed on an electrooptic substrate that includes an optical waveguide pattern. The waveguide electrode structure includes an RF feed line electrode coupled to the ring electrode. The RF feed line signal excites an inherent resonant mode of the ring to thereby cause an electric field to resonate between the ring electrode and ground electrode and pass into sections of the optical waveguide pattern. By appropriately positioning the ring and ground electrodes to overlay portions of the optical waveguide structure in the electrooptic substrate, a light beam launched into the waveguide pattern can be modulated to produce a pulse with zero chirp.

18 Claims, 9 Drawing Sheets

RESONANT OPTICAL MODULATORS WITH ZERO CHIRP

BACKGROUND OF THE INVENTION

1. Field of the Invention

The present invention relates to optical modulators that are of interest to communication systems, and more particularly, to resonant optical modulators used in such systems.

2. Discussion of the Related Art

As the demand for high-speed and complex optical communication systems continues to grow, so too has the need for reliable high-speed devices needed for modulating optical signals traversing such systems. Optical modulators are of great interest in operating a fiber optic communication system in the range of 2.5 to 10 Gbps (Giga bits per second), and potentially to 40 Gbps or more. Of particular interest are modulators having low operating voltage and low optical and/or electrical losses that can reliably modulate optical signals transmitted through optical fiber or other optical media. Also of interest are modulator devices that can be integrated into optical circuits that may comprise a plurality of modulators and other related devices disposed on a common substrate.

There exist certain types of anisotropic materials of uniaxial crystal whose permittivities are directly proportional to an applied electric field and vary almost linearly with an applied electric field. This electrooptic property is known as the Pockels effect. Applying an electric field across an area occupied by a light signal in these types of uniaxial materials can modulate the light signal utilizing the electrooptic properties of the material. Because wave velocity is generally inversely proportional to the square root of the permittivity of the material in which the wave is propagating, a change in permittivity affects wave velocity within the electric field. In uniaxial crystal waveguides, this effect is advantageously used to shift a phase of the carrier wave traveling through the crystal and thus modulates the carrier wave phase.

In a simple form, a phase modulator can consist of a single channel optical waveguide formed within uniaxial material with electrodes disposed in such a way that an electric field applied across the channel modulates the phase of the carrier wave propagating within the channel. Another commonly used waveguide structure used for optical modulation is the Mach-Zehnder Interferometer (MZI), as illustrated in FIG. 1. An MZI includes a waveguide channel 12 having two opposing Y junctions 10a and 10b joined by waveguide arms 12a and 12b. Waveguide 12 is formed within uniaxial material to exploit electrooptic effects, as described above. In the illustrated MZI, the waveguide junctions are symmetrical and operate as 50:50 power dividers.

FIG. 2 shows an optical modulator using an MZI having coplanar waveguide electrodes 22–26 formed over optical waveguide 12. Electrodes 22 and 24 are supplied with a ground potential, while electrode 26 is supplied with an RF signal that terminates at impedance $R_T$. In operation, a carrier wave from a light source, for example a DFB laser, enters at optical waveguide input 14, the carrier power is evenly split at the first Y junction 10a into the two light channels of the MZI arms 12a and 12b. By applying an electric field between the electrode 26 and ground electrodes 22 and 24, oppositely oriented electric field vectors exist in the crystal, one in each MZI arm 12a and 12b. Consequently, the carrier light wave within each of the arms is complementarily phase shifted relative to one another in push-pull fashion. Light from each arm is then combined at Y junction 10b where constructive or destructive interference resulting from combining phase shifted carrier waves causes signal intensity modulation. When the total phase shift θ between the carrier waves in arms 12a and 12b is such that θ=π, light entering the device at 14 radiates into the substrate and results in zero channel output at 15.

Of uniaxial materials used to fabricate optical modulators, lithium niobate ($LiNbO_3$) or lithium tantalate ($LiTaO_3$) are popular substrate choices. $LiNbO_3$ is widely used due to its combination of low loss characteristics, high electrooptic coefficients, and high optical transparency in the near infrared wavelengths used for telecommunications. Its high Curie temperature (1100° C.–1180° C.) makes it practical for fabrication of optical waveguides because strip waveguides can be fabricated by means of Ti-indiffusion at temperatures near 1000° C.

$LiNbO_3$ wafers are available in three different crystal cuts (x-, y-, and z-cut). FIGS. 3a and 3b respectively illustrate a cross-section of x-cut and z-cut $LiNbO_3$ substrates 11. For the most pronounced electrooptic effect, the strongest component of the applied electric field is aligned with the z-axis of the crystal (because the z-axis has the highest electrooptic coefficient) to take advantage of the $r_{33}$ coefficient. On z-cut $LiNbO_3$, vertical fields are used with a TM mode to take advantage of the $r_{33}$ coefficient. On x-cut, horizontal field electrodes and a TE mode utilize the $r_{33}$ coefficient.

As shown in FIG. 3a, x-cut crystal substrates require placement of MZI arm 12a between electrodes 22 and 26, and arm 12b between electrodes 26 and 24. FIG. 3b illustrates a z-cut crystal, where RF and ground electrodes must be placed directly over waveguide arms 12a and 12b. Thus, in both the x- and z-cut cases, applied electric fields from respective TE and TM modes of the RF input are aligned with the z-axis of the $LiNbO_3$ crystal. While not shown in FIG. 3b, an insulation buffer film such as silicon dioxide or $Al_2O_3$ may be used as a buffer to minimize z-cut $LiNbO_3$ optical losses that occur through TM mode absorption in the electrode metal. Buffer films are also beneficial to x-cut $LiNbO_3$ devices operating at high frequency.

$LiNbO_3$ modulators are used external to a source of an optical signal, unlike directly modulating a light source that provides an optical signal, such as a laser diode. External modulation avoids chirping (a time-dependent fluctuation of the wavelength in a modulated optical beam) and patterning effects inherent to directly modulated lasers, which is particularly important in digital applications requiring large extinction ratios.

$LiNbO_3$ modulators are widely used in digital applications to modulate a carrier wave using RF input in several modulation formats. Of particular interest are return-to zero (RZ) modulation formats. The RZ format has been employed in recent high-bandwidth terrestrial and submarine systems, especially those requiring long transmission distances. Dispersion managed soliton and other narrow-pulse transmission techniques can be considered specialized versions of RZ transmission.

Unlike the nonreturn-to-zero (NRZ) format, where binary data represented by a modulated carrier wave output maintains a high level when representing a "1" in a bit interval, in RZ coding of binary data, the output returns to a "zero" level for one or more portions of the bit interval. In the conventional NRZ pulse format, interaction between self-phase modulation (SPM) and group velocity dispersion (GVD) causes transfer of energy from the center of the pulse toward the pulse edges. Use of RZ format in a dispersion-managed system allows for balancing SPM and GVD, resulting in greater pulse-to-pulse consistency.

Recent high dense wavelength division multiplexed (DWDM) channel loading, increased bit-rate requirements of next-generation systems, and the desire to build wavelength-intelligent networks, have pushed the capabilities of the NRZ transmission to its limits. Thus, there remains a need in the art for external modulation devices capable of producing pulse forms necessary to transmit broad band optical signal data through optical fibers, and to alleviate the aforementioned problems associated with present optical communication systems.

SUMMARY OF THE INVENTION

The present invention has been made in view of the above circumstances and provides a resonant optical modulator for optical communication systems.

One aspect of the present invention relates to using a resonating electric field to modulate a light signal.

Another aspect of the present invention relates to modulating a light signal in an electrooptic substrate using a resonating ring circuit.

Yet another aspect of the present invention relates to using a coplanar resonant ring circuit to form a light pulse.

Still yet another aspect of the present invention relates to a modulator having a resonating ring electrode that is a pulse-forming generator in an optical communication system.

Another aspect of the invention relates to a pulse generating modulator that operates at a single modulating signal frequency.

Yet another aspect of the present invention relates to a resonant optical modulator having a resonant electrode formed into a closed loop that is capable of supporting all harmonic modes.

Another aspect of the present invention relates to a resonant optical modulator having a resonant electrode formed into a closed loop having one or more slit, notch and/or stub structures.

Still another aspect of the present invention relates to an optical modulator having low coupling losses and low drive power requirements.

Additional aspects and advantages of the invention will be set forth in part in the description that follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE PREFERRED EMBODIMENTS

Reference will now be made in detail to the present exemplary embodiments of the invention illustrated in the accompanying drawings. Whenever possible, the same reference numbers will be used throughout the drawings to refer to the same or like parts.

Figure 1:
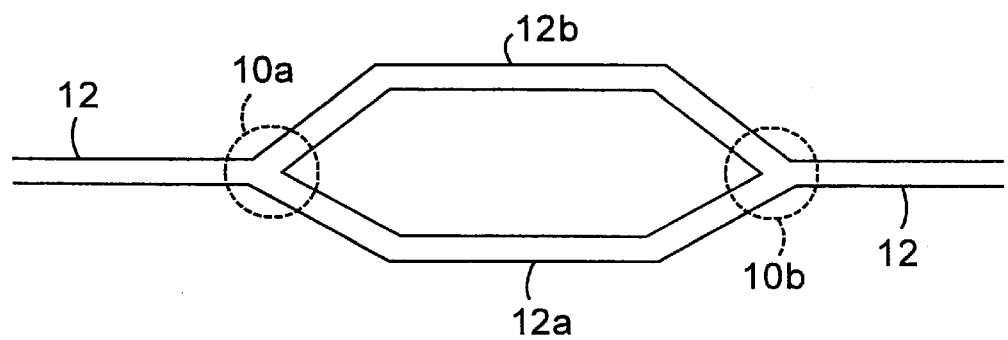
FIG. 1 depicts a top view of a Mach-Zehnder Interferometer (MZI).
Figure 2:
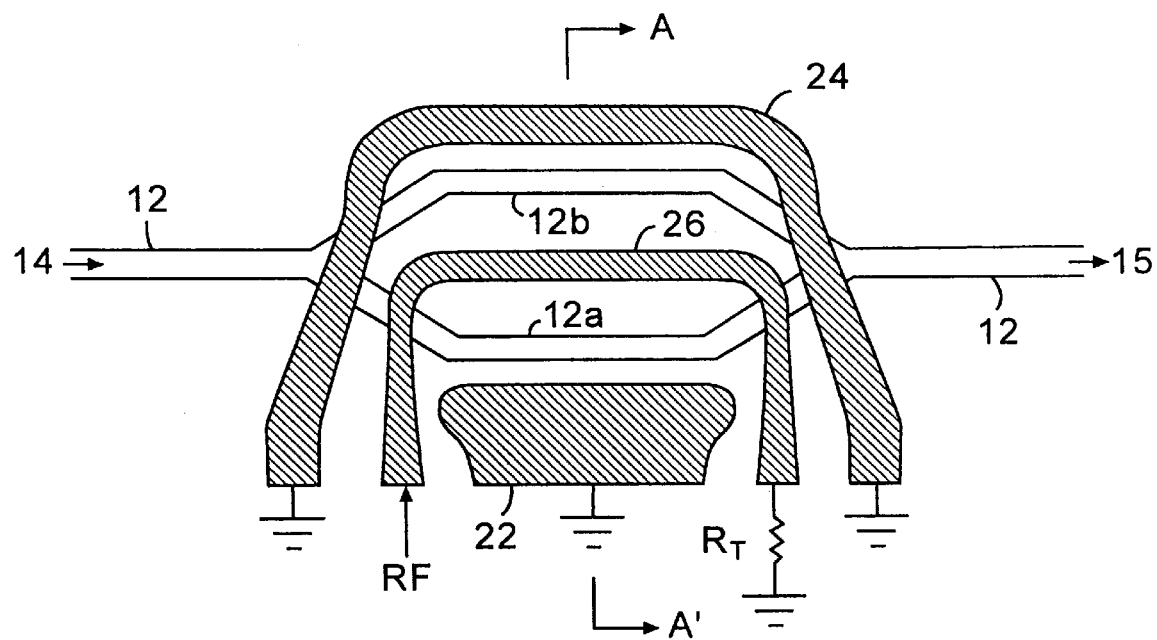
FIG. 2 illustrates a top view of an x-cut $LiNbO_3$ optical modulator using the MZI of FIG. 1.
Figure 3A:
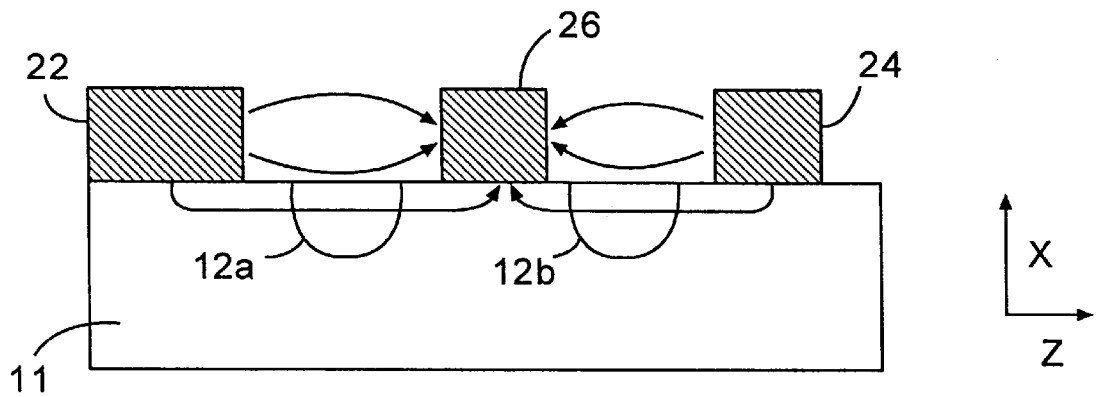
FIG. 3a is a cross-sectional view taken along A–A' of FIG. 2
Figure 3B:
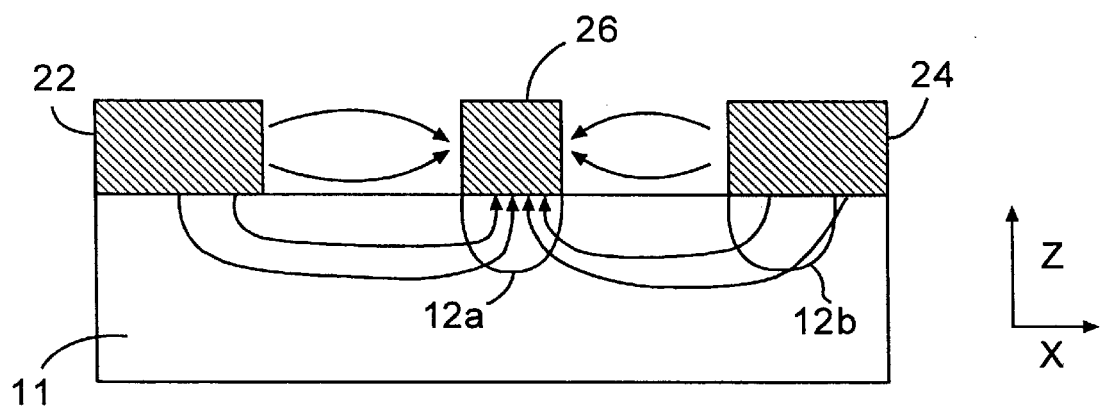
FIG. 3b is a cross-sectional view of a z-cut $LiNbO_3$ modulator.
Figure 4:
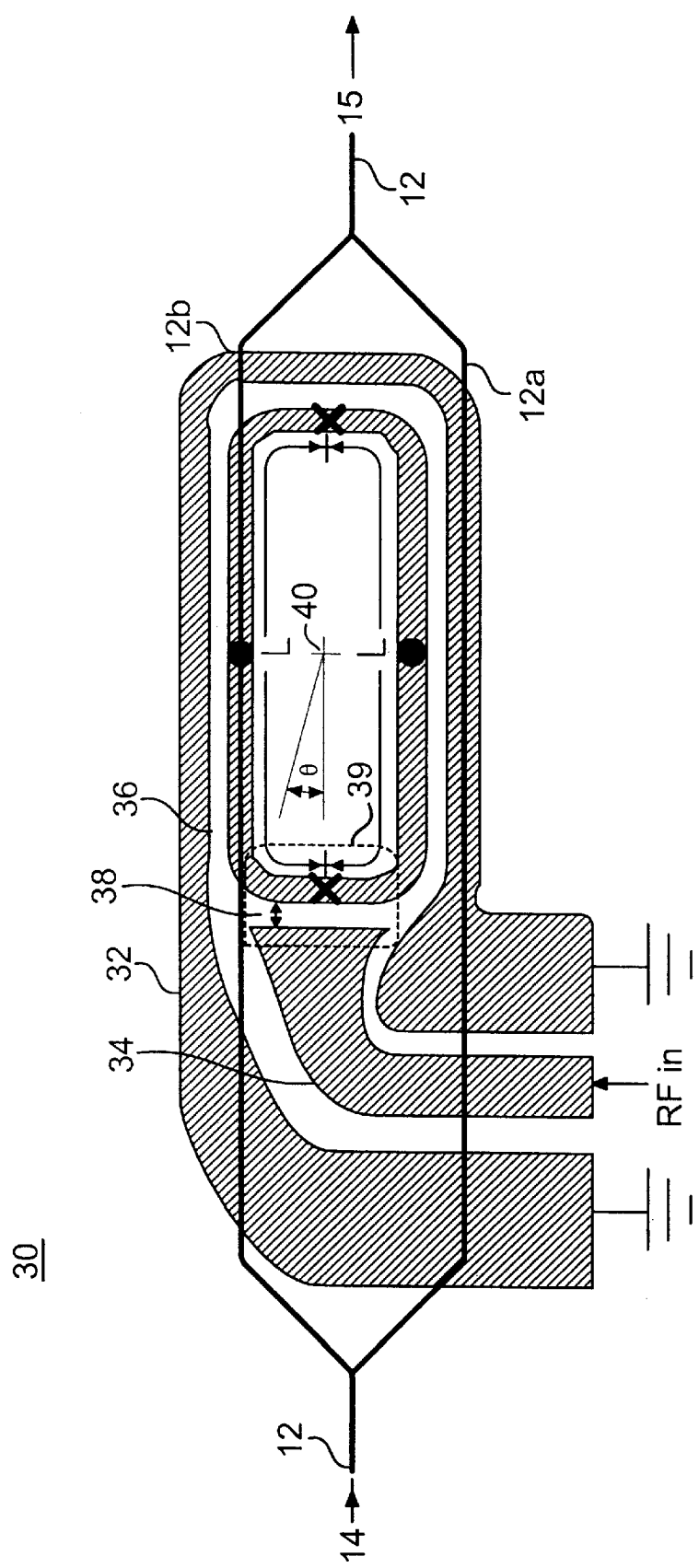
FIG. 4 is a top view of a first exemplary embodiment of a resonant optical modulator according to the present invention.

The present invention uses a ring resonating circuit to modulate light in MZI waveguides. FIG. 4 shows a resonant optical modulator 30 of the first embodiment of the present invention. The outline 12 shown in FIG. 4 represents a waveguide structure formed in $LiNbO_3$, as previously described with respect to FIG. 1. Waveguide 12 may be formed by diffusing titanium into the crystal substrate according to an MZI pattern. The diffused titanium raises an optical refraction index of the crystal in the waveguide portion so that laser light projected into one end of the crystal will travel along the MZI patterned waveguide and be guided by the waveguide because of its higher optical index. Alternatively, other processes or methods, such as an annealed proton exchange process where Li ions from the $LiNbO_3$ are exchanged with protons in an acid bath, can be used to raise the optical index of the $LiNbO_3$ crystal. Overlaying the waveguide is a coplanar ring resonator section that includes ground plane electrode 32, an RF feed line electrode 34, and resonant ring electrode 36 preferably formed in an elongated loop-shape. One portion of ground electrode 32 overlies waveguide arm 12a, and one portion of ring electrode 36 overlies and overlaps waveguide arm 12b.

Resonant ring electrode 36 is a full-wave resonator formed by closing a transmission line into a continuous closed loop. RF feed line electrode 34 is separated from ring electrode section 36 by a coupling gap 38. Power is coupled into and out of the resonator ring section 36 through RF feed line 34. The coupling gap 38 between the resonator and feed line should be such that the signal can be coupled to the resonator without affecting the intrinsic resonant frequencies of the ring resonator section.

Ring electrode 36 can be considered as having two lengths, L, for a total circumference of 2L. Resonance is established when the ring geometry is formed such that the mean circumference of the ring resonator is equal to an integral multiple of a guided wavelength. This may be expressed as $$2\pi r = N\lambda_g, \text{ for } N=1, 2, 3, \ldots \quad (1)$$

where r is the mean radius of the ring, $\lambda_g$ is the guided wavelength, and integer N is the mode number. From this equation, the resonant frequencies for different modes can be calculated since $\lambda_g$ is frequency dependent.

$\lambda_g$ can be related to frequency by $$\lambda_g = \lambda/(\epsilon_{\mathit{eff}})^{1/2} = (1/(\epsilon_{\mathit{eff}})^{1/2})(c/f) \quad (2)$$

where c is the speed of light, $\lambda$ is the free space RF signal wavelength and $\epsilon_{\mathit{eff}}$ is the effective dielectric constant of the ring material. Combining (1) and (2), and since $2\pi r=2L$, the resonant frequencies can be expressed as $$f = Nc/(2\ n_m L) \text{ for } N=1, 2, 3 \ldots \quad (3)$$

where $n_m$ is the microwave index of resonant ring electrode 36.

The resonant structure of FIG. 4 operates a single frequency, and thus does not have to operate over a broad range of frequencies. As shown in FIG. 4, an RF signal is applied to device 30 through RF feed line electrode 34. The signal is coupled through gap 38 to resonant ring electrode 36 that forms a closed loop. For example, for the fundamental mode when N=1, the resonant frequency f of the RF signal is $f=c/(2\ n_m L)$. The "x" and "•" symbols superimposed on resonant ring 39 respectively represent voltage maximum (current minimum) and voltage minimum (current maximum) in a snapshot of a resonating field when N=1. If the perimeter of the closed loop (2L) is such that resonance can be established in the structure at a given RF frequency f, then the efficiency of the interaction between the RF signal and the underlying optical wave is enhanced. In view of this, and since the resonator structure does not require terminal impedance, modulated optical pulses can be produced at a single RF signal frequency and with low drive power. Moreover, the resonant modulator of the present invention allows for true push-pull operation since modulation occurs for optical carriers traveling in both MZI arms 12a and 12b.

In higher order modes (N>1), the elongated closed loop resonant ring 36 of FIG. 4 will resonate with an electric field maximum at evenly distributed points around the ring. For example, for N=2, an electric field maximum is supported at the excitation point, at $\phi=180°$ from the excitation point, at $\phi=90°$, and at $\phi=270°$, where $\phi$ is an angle measured clockwise along the ring from the excitation point using the resonant ring electrode center 40 as the origin. In an even mode (N=2, 4, 6, . . . ), a continuous closed ring always supports electric field maximum at these points. In an odd mode (N=1, 3, 5, . . . ), an electric field minimum will always occur at $\phi=90°$ and $\phi=270°$. The resonant ring electrode of the present invention may operate at any desired mode by supplying an appropriate RF signaling frequency to feed line 34.

Generally, elongating an optical modulator will result in lower $V_\pi$, where $V_\pi$ is the voltage necessary to achieve a $\pi$-phase shift. Compared with a linear resonator, using a ring resonator increases the effective length of a resonator. Also, linear resonators are half-wave devices, and depending on how they are excited, can only support odd or even harmonic modes. Closed loop ring resonators, on the other hand, are full wave devices that support all harmonic modes.

The resonant modulator shown in FIG. 4 is a zero chirp device. This is accomplished by locating one of the MZI waveguide arms 12b under the resonant electrode structure, the other arm 12a under the ground plane electrode 32, and ensuring that the electrooptic overlap integrals are equal and opposite for each arm. The particular configuration shown in FIG. 4 pertains to a z-cut $LiNbO_3$ crystal. For an x-cut $LiNbO_3$ crystal, the waveguide arms would be located between the resonant electrode 36 and ground plane electrode 32 to maintain electric field lines substantially along the z-axis of the $LiNbO_3$ crystal.

To achieve resonant modulators having low drive voltage, low-loss coupling structures should be used. Increasing the coupling periphery between the RF signal from the feed line 34 may enhance coupled power between the feed line and the resonant ring electrode 36. For example, RF feed line 34 can be flared at its end where it feeds into resonant ring electrode 36, as shown in FIG. 4. Coupling should be accomplished in such a way that the intrinsic fields of the resonator are minimally perturbed.

Alternatively, or in combination with increased coupling periphery, enhanced coupling can be realized by using a dielectric overlay over the coupling gap, as shown by dotted line 39 in FIG. 4. This can be accomplished in a variety of ways. For example, an insulated copper tape can be placed over the gap. The insulation material between the tape and the coplanar lines forms the coupling capacitance. Accordingly, coupling capacitance so formed effectively corresponds to a much smaller gap. Of course, any number of dielectrics known to those skilled in the art may be used to achieve the similar results, such as silicon dioxide. Dielectric overlays described above can also be used in any coupling scheme disclosed herein, and equivalents thereof, when practicing the present invention.

Figure 5A:
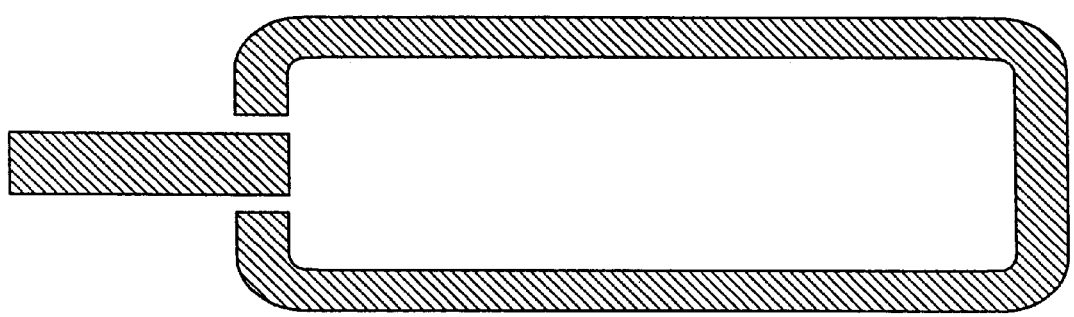
FIGS. 5a–5c are illustrations of feed line and ring electrode coupling arrangements that may be used in connection with the present invention.
Figure 5B:
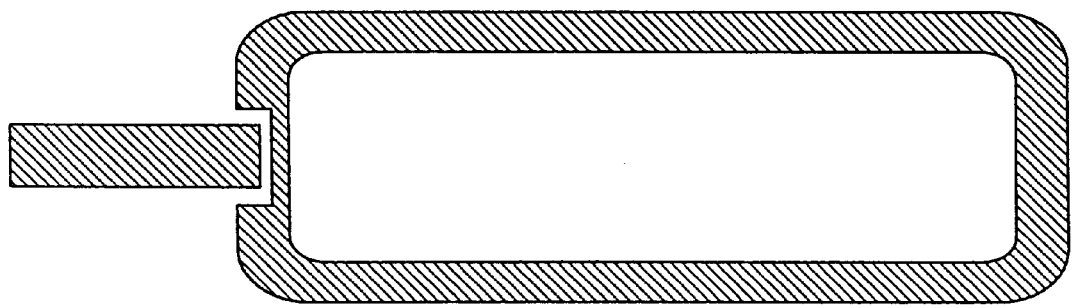
Figure 5C:
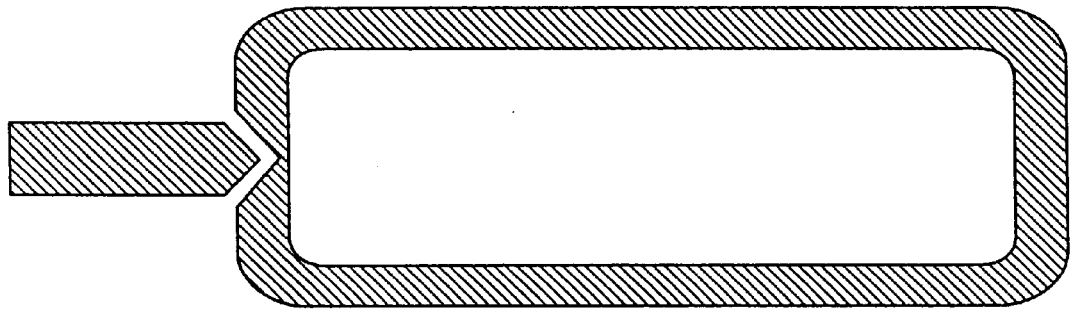

FIGS. 5a–5c illustrate several alternative coupling structures that may be used with the present invention for coupling power from an RF feed line electrode 34 into resonant ring electrode 36. FIGS. 5a–5c only show feed line electrode 34 and resonator electrode 36 for purposes of illustrating exemplary coupling schemes. In each of FIGS. 5a–5c, feed line electrode 34 is moved between portions of a resonator ring electrode 36 to enhance the end coupling of the resonator structure. Moving a feed line electrode 34 closer a resonant ring electrode 36 may, to some limited extent, perturb inherent resonant fields within the ring structure. However, each of the illustrated embodiments introduces a tradeoff between increasing the coupled power into the ring resonator section and minimizing field perturbation that may be considered when designing for particular operating requirements.

In FIG. 5a, a slit 42 is made in resonator ring electrode 36 and feed line electrode 34 is moved in between slit 42. Slits formed in a ring resonator introduce forced resonant modes, discussed in more detail below. FIG. 5b shows a coupling scheme where feed line electrode 36 is fed into a notch 44 made in the ring electrode periphery. A V-shaped groove 46 in ring structure 36 is shown in FIG. 5c, wherein a tapered feed line electrode 34 is fed into the resonator ring electrode 36. As would be apparent to those skilled in the art, each of these schemes can increase coupling area between a ring resonator feed line and ring structure.

Resonant modes coupled into the resonant ring electrode 36 shown in FIG. 4 are regular modes, and are determined from equation (3). However, opens in the ring, such as slits, excite forced modes in the ring due to boundary conditions introduced by the opens. FIGS. 6a–6f illustrate several excitable modes using slits.

Figure 6A:
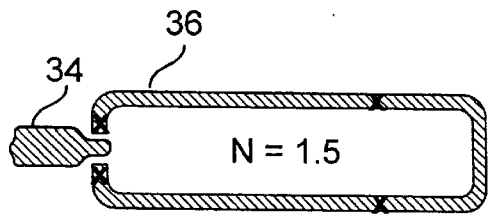
FIGS. 6a–6f are illustrations of resonant modes within resonant ring electrodes having slits.
Figure 6B:
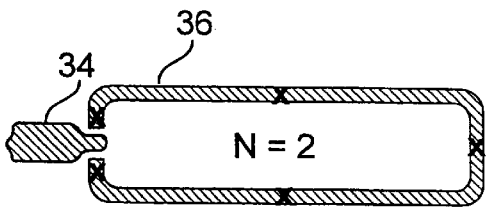

Half-modes can be supported in the ring when a single open is formed in the resonant ring electrode 36 at the ring excitation point. However, integer odd modes are not supported in a resonant ring electrode having only a single slit. Thus, for equation (3), N=1.5, 2, 2.5, 3.5, 4, . . . , and so on. The first two modes N=1.5 and N=2 are illustrated in FIGS. 6a and 6b. In the presence of the slit, the fields in the resonant ring electrode 36 are altered so that the corresponding boundary conditions introduced by the slit are satisfied.

Figure 6C:
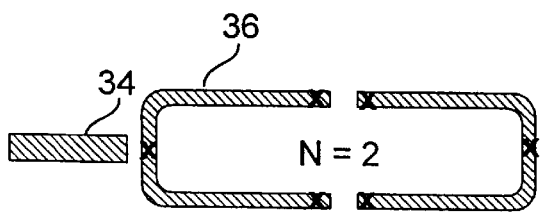
Figure 6D:
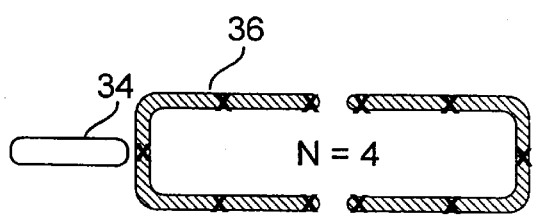

FIGS. 6c and 6d show the effect on resonant modes of the resonant ring electrode when slits are located $\phi=\pm 90°$ from the feed line excitation point on the ring. Modes supported in this structure are the N=2, 4, 6, . . . , i.e., the even modes. All odd modes are suppressed, and no half-modes are supported.

Figure 6E:
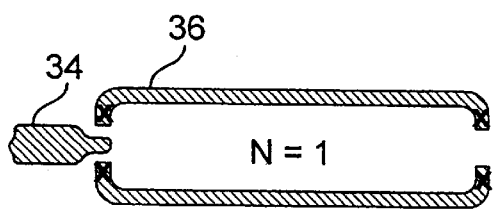
Figure 6F:
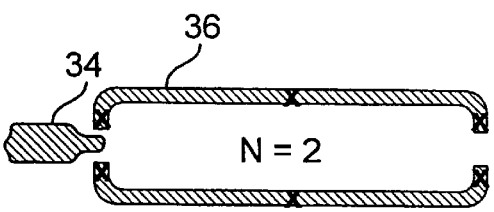

When slits are introduced into a resonant ring electrode 36 only at $\phi=0°$ and $\phi=180°$, as respectively illustrated in FIGS. 6e and 6f for modes N=1 and N=2, a mode configuration results that is least susceptible to slit-related field perturbation. Modes supported in this configuration are substantially identical to regular modes described above for the close loop resonant ring electrode.

As would be apparent to those skilled in the art, a variety of field perturbing structures may be introduced into the resonant ring electrode to allow a designer flexibility in locating resonant fields over a modulator optical waveguide path. For example, notches, such as the one shown in FIG. 5b, may be formed at locations along the resonant ring electrode to cause controlled mode splitting. Any combination of notches, slits, and/or stubs may be used to tune, and/or to locate fields within the resonant ring electrode in accordance with the present invention.

Figure 7:
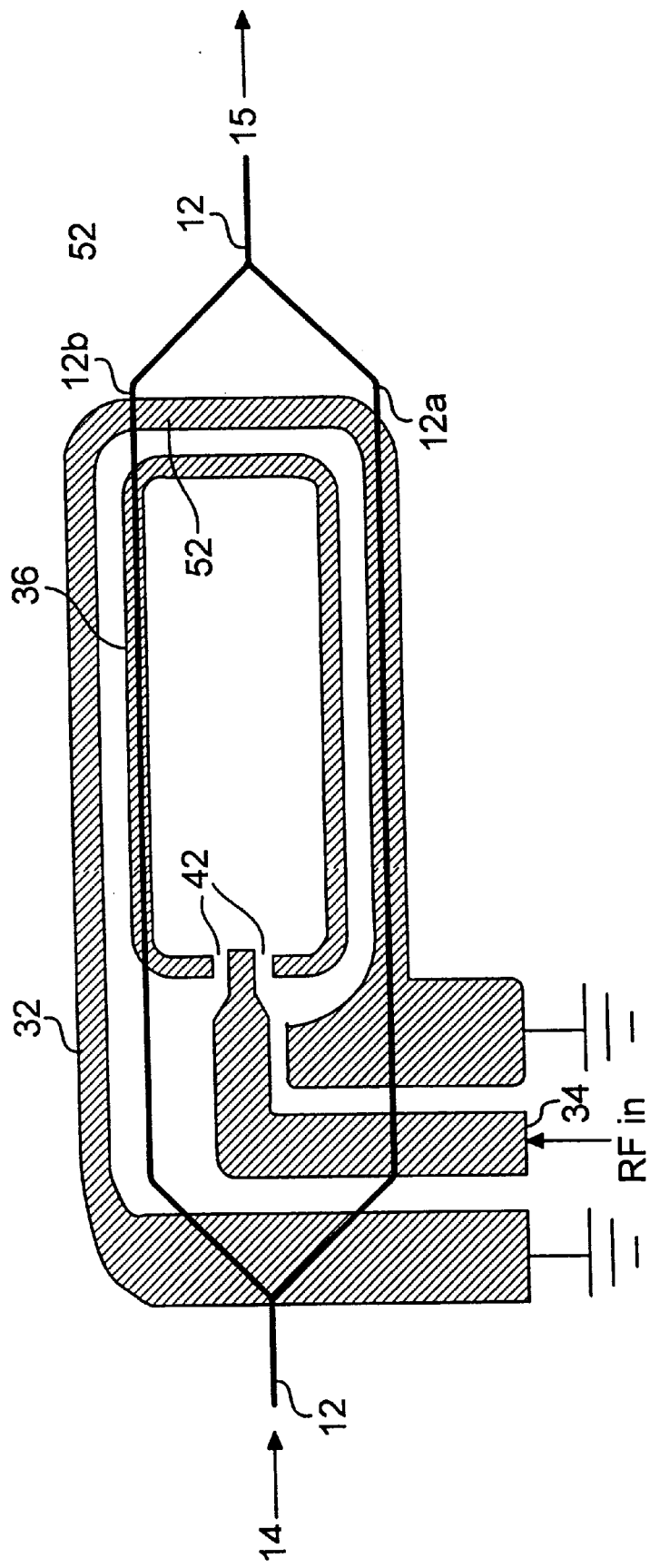
FIG. 7 is a top view of a second exemplary embodiment of a resonant optical modulator according to the present invention.

FIG. 7 shows a second embodiment of the present invention illustrative of a resonant optical modulator with resonant ring electrode having a single slit that includes the enhanced coupling structure of FIG. 5a. The modulator of FIG. 7 differs from the one of FIG. 4 in that feed line electrode coupling with the ring is enhanced by forming a slit 42 in resonator ring electrode 36 and moving feed line electrode 34 to a position between sides of slit 42. In this design, a field maximum is maintained at the excitation point where the slit of the ring electrode resides, and ring electrode 36 may support even and half-modes, as shown in FIGS. 6a and 6b. A configuration similar to ones shown in FIGS. 6e and 6f may be attained without appreciably perturbing the inherent resonant fields of the ring by placing a second slit at 52. A resonant modulator thus formed yields a coplanar ring resonator section with enhanced coupling and one that may be resonated at all harmonic modes.

Figure 8:
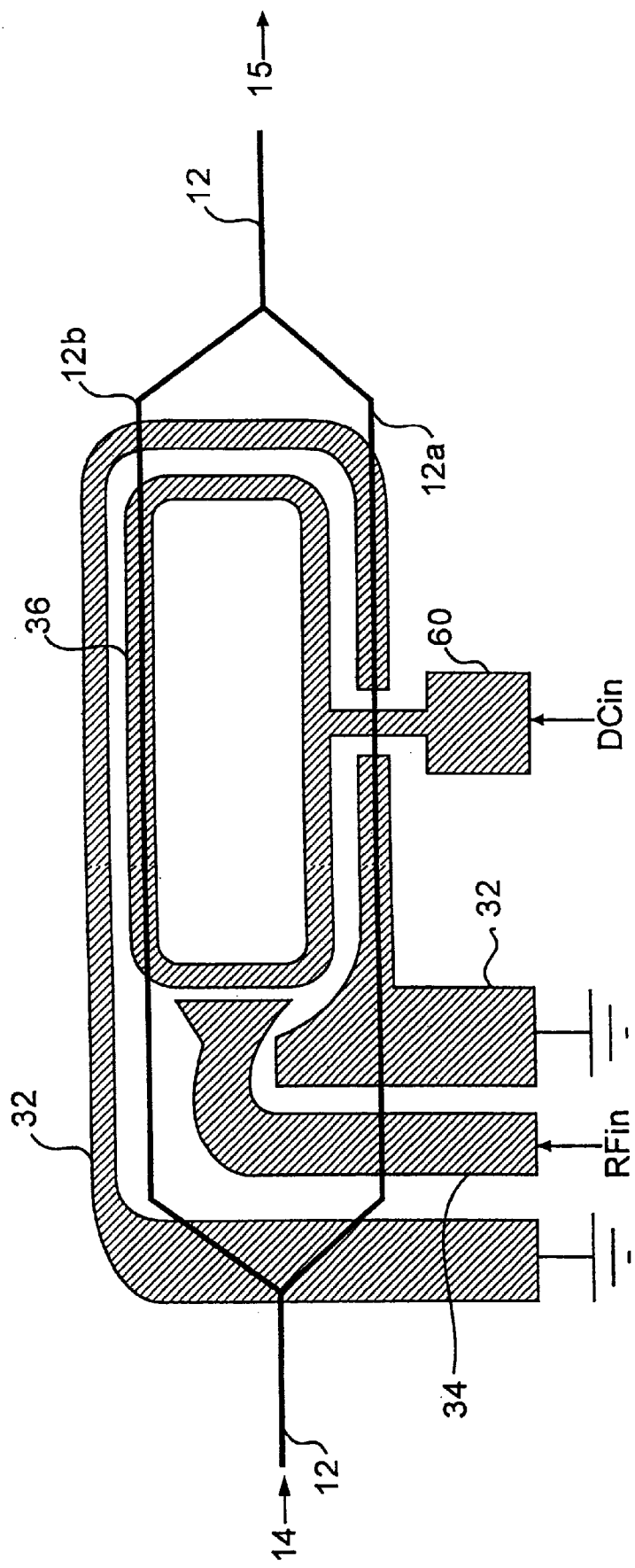
FIG. 8 is a top view of a third exemplary embodiment of a resonant optical modulator according to the present invention.

FIG. 8 illustrates a resonant modulator electrode structure that enables application of a DC bias to the resonant ring electrode. Ring electrode 36 can be tapped at any voltage minimum (current maximum) position, such as the one shown with biasing electrode connection 60, without appreciably perturbing the intrinsic fields of the resonator. The resonant modulator of the present invention may be biased by coupling a RF signal to feed line 34 and a DC voltage to bias electrode 60, and thus eliminate the need for separate cascaded DC biasing electrodes. Moreover, elimination of the need for separate biasing electrodes allows for additional surface space that can be used for further device integration, or longer MZI and ring electrode sections to optimize device drive power.

Figure 9A:
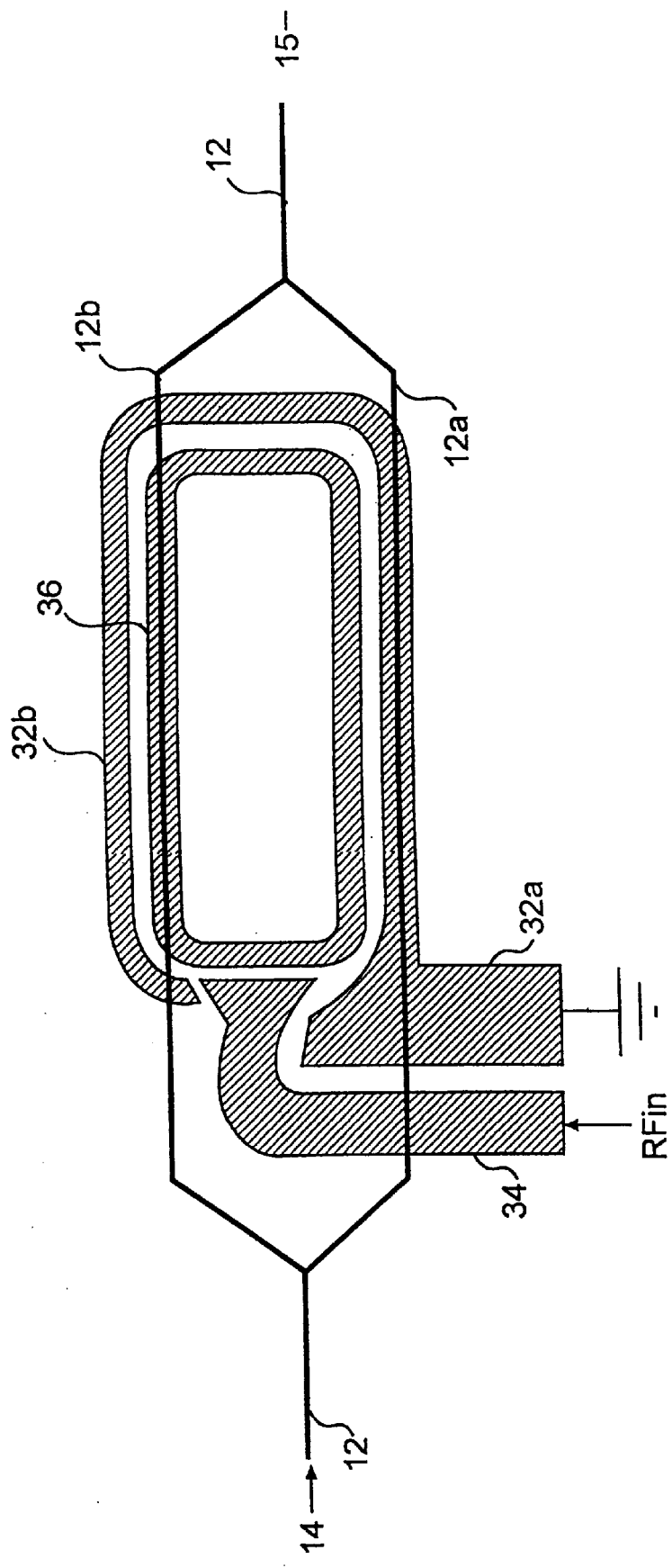
FIG. 9a is a top view of a fourth exemplary embodiment of a resonant optical modulator according to the present invention.
Figure 9B:
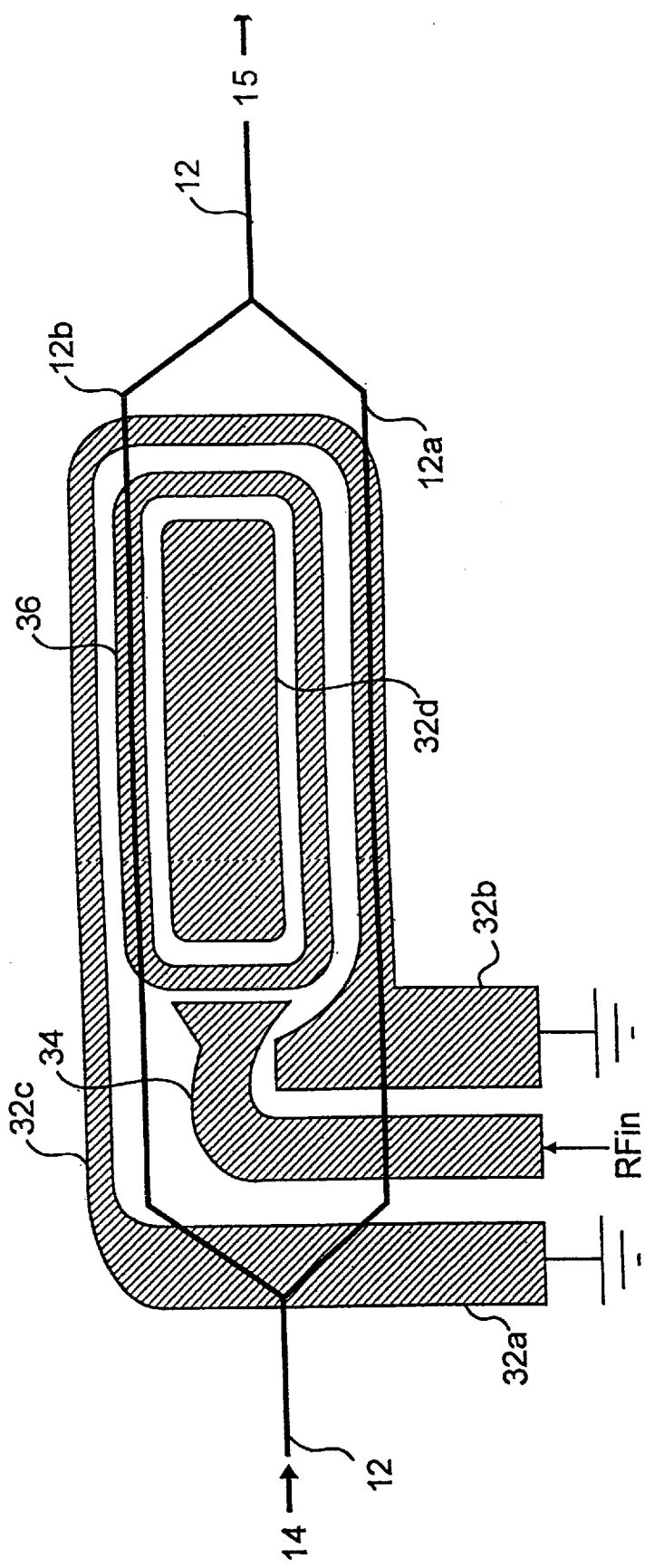
FIG. 9b is a top view of a fifth exemplary embodiment of a resonant optical modulator according to the present invention.

While the loop-shaped ring resonator electrode and the RF electrode arrangements described above respectively correspond to coplanar strip (CPS) and coplanar waveguide (CPW) configurations, the present invention may use any combination of CPS and CPW configurations. For example, FIG. 9a shows a resonant optical modulator that includes a CPS waveguide 34, 32a for directing the electromagnetic wave corresponding to the RF signal to the loop-shaped electrode 36 and surrounding ground electrode 32b. FIG. 9b shows a resonant optical modulator including a CPW RF electrode arrangement 32a, 32b, and 34 coupled to a CPW resonating section that includes ground 32c, loop-shaped electrode 36 and a ground electrode 32d in an inside portion of the loop-shaped electrode 36. Of course, other combinations may be used, such as a CPS RF electrode section and a CPW resonating electrode section.

In systems that employ return-to-zero (RZ) modulation format, the resonant optical modulator of the present invention may be used as a pulse generator. Such a device may be cascaded with other devices, such as a data modulator, a phase modulator (for pre-chirping the signal for transmission through a dispersive fiber), and an attenuator (for multi-channel equalization) in DWDM systems. A resonant optical modulator may be packaged as a single device, or integrated with several other optical devices on a common substrate material capable of electrooptic effect. Pulses may be produced by the resonant modulator that may be used in a variety of ways, such as in applications requiring a pulse train, a switch, or light modulation for data representation.

The present invention can be applied to any electrooptic material system capable of changing its optical characteristics under the influence of an electric field. While the embodiments above primarily described modulators using z-cut uniaxial crystal, the invention can also be used with x- or y-cut uniaxial crystal material by appropriately positioning the feed line, ground and resonant ring electrodes. In addition, while the above embodiments generally describe digital applications, the present invention also may be used in analog optical modulation system applications, such as CATV signal distribution, wide-band microwave signal distribution, antenna remoting, or as a synchronization pulse generator.

As should be clear from the embodiments described above, the present invention presents a zero chirp resonant modulation device useful for high-speed modulation of broadband optical data in optical circuits and/or fiber optic communication systems. The device requires low drive power and can be integrated with a plurality of additional optical devices on a common electrooptic substrate.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A resonant optical modulator comprising:

a substrate having an electrooptic effect;

an optical waveguide formed in the substrate, wherein the optical waveguide comprises a first section for launching a laser light to be modulated, a first junction splitting the first section into first and second arm sections, a second junction joining the first and second arm sections, and a second section extending from the second junction for outputting a modulated form of the laser light;

a loop-shaped electrode formed on the substrate and above the first and second arm sections;

an RF electrode formed on the substrate and electrically coupled to the loop-shaped electrode for coupling power to the loop-shaped electrode; and a ground electrode associated with the RF electrode and formed on the substrate to substantially surround the first electrode, wherein an electric field resonates between the loop-shaped electrode and the ground electrode in response to the power coupled from the RF electrode.

2. The resonant optical modulator of claim 1, wherein an end portion of the RF electrode and an edge portion of the loop-shaped electrode are separated by a gap, and power from the RF electrode and the associated ground electrode is coupled to the loop-shaped electrode across the gap.

3. The resonant optical modulator of claim 2, wherein a dielectric layer overlies a portion of the RF electrode and the loop-shaped electrode, and is within the gap.

4. The resonant optical modulator of claim 2, wherein a slit is formed in the loop-shaped electrode; the RF electrode is formed between sides of the slit; and the gap is one of two gaps formed on both sides of the RF electrode between the sides of the slit.

5. The resonant optical modulator of claim 4, wherein a second slit is formed at a position of voltage maximum in one of the inherent resonating modes of the loop-shaped electrode.

6. The resonant optical modulator of claim 2, wherein the edge portion of the loop-shaped electrode includes a notch, and the end portion RF electrode is formed within the notch with the gap separating the end portion of the RF electrode and the edge portion of the loop-shaped electrode.

7. The resonant optical modulator of claim 6, wherein the notch is V-shaped, and the RF end portion is tapered.

8. The resonant optical modulator of claim 2, wherein the RF electrode end portion is flared.

9. The resonant optical modulator of claim 1, wherein a plurality of slits are formed in the loop-shaped electrode.

10. The resonant optical modulator of claim 1, wherein the RF electrode and the ground electrode associated with the RF electrode form any one of a coplanar waveguide (CPW) electrode configuration and a coplanar strip (CPS) electrode configuration, and the loop-shaped electrode and the ground electrode surrounding the loop-shaped electrode form any one of a CPS and a CPW electrode configuration.

11. The resonant optical modulator of claim 10, wherein the substrate is z-cut LiNbO$_3$ crystal, the loop-shaped electrode has first and second elongated sections, one of the first and second arm sections directly underlies one of the first and second elongated sections, and the other of the first and second arm sections underlies a portion of the ground electrode.

12. The resonant optical modulator of claim 10, wherein the substrate is x-cut LiNbO$_3$ crystal, the loop-shaped electrode has first and second elongated sections; the first arm section is between the first elongated section and a first portion of the ground electrode; and the second arm section is between the second elongated section and a second portion of the ground electrode.

13. The resonant optical modulator of claim 1, further comprising a buffer layer formed on the substrate, wherein the RF electrode, the loop-shaped electrode and the ground electrode are formed on the buffer layer.

14. The resonant optical modulator of claim 1, wherein a DC biasing electrode is formed on the substrate and contacts the loop-shaped electrode at or near a position of voltage minimum in one of the inherent resonating modes of the loop-shaped electrode.

15. A communication system employing return-to-zero (RZ) modulation format, comprising:
an RZ pulse generator comprising a resonant optical modulator, wherein the resonant optical modulator comprises:
a substrate having an electrooptic effect;
an optical waveguide formed in the substrate, wherein the optical waveguide comprises a first section for launching a laser light to be modulated, a first junction splitting the first section into first and second arm sections, a second junction joining the first and second arm sections, and a second section extending from the second junction for outputting a modulated form of the laser light;
a loop-shaped electrode formed on the substrate and above the first and second arm sections;
an RF electrode formed on the substrate and electrically coupled to the loop-shaped electrode for coupling power to the loop-shaped electrode; and
a ground electrode associated with the RF electrode and formed on the substrate to substantially surround the first electrode, wherein an electric field resonates between the loop-shaped electrode and the ground electrode in response to the power coupled from the RF electrode.

16. A wavelength division multiplexed optical transmission system, comprising:
an optical phase modulator;
an optical attenuator;
an optical data modulator; and
a resonant optical modulator, wherein the resonant optical modulator comprises:
a substrate having an electrooptic effect;
an optical waveguide formed in the substrate, wherein the optical waveguide comprises a first section for launching a laser light to be modulated, a first junction splitting the first section into first and second arm sections, a second junction joining the first and second arm sections, and a second section extending from the second junction for outputting a modulated form of the laser light;
a loop-shaped electrode formed on the substrate and above the first and second arm sections;
an RF electrode formed on the substrate and electrically coupled to the loop-shaped electrode for coupling power to the loop-shaped electrode; and
a ground electrode associated with the RF electrode and formed on the substrate to substantially surround the first electrode, wherein an electric field resonates between the loop-shaped electrode and the ground electrode in response to the power coupled from the RF electrode.

17. The system of claim 16, wherein at least two of the resonant optical modulator, the optical phase modulator, the optical attenuator and the optical data modulator are formed as integrated devices on a common electrooptic substrate.

18. The system of claim 17, wherein the integrated devices are connected in cascade.

* * * * *